United States Patent [19]

Brown et al.

[11] 4,283,066
[45] Aug. 11, 1981

[54] TANK SUPPORT FOR A TANK TRUCK

[75] Inventors: Carl E. Brown, Troy; Edwin C. Rosenberger, Piqua, both of Ohio

[73] Assignee: Chem-Lawn Corporation, Columbus, Ohio

[21] Appl. No.: 92,244

[22] Filed: Nov. 7, 1979

[51] Int. Cl.³ .............................................. B60P 3/22
[52] U.S. Cl. ................................. 280/5 D; 296/35.1
[58] Field of Search ............. 280/5 D, 5 R, 5 C, 5 E; 296/15, 35.1, 35.3; 105/358, 359, 360, 361, 362, 453; 410/46, 47, 48, 49, 50

[56] References Cited

U.S. PATENT DOCUMENTS

| | | | |
|---|---|---|---|
| 1,856,399 | 5/1932 | Phillips | 280/5 D |
| 1,946,834 | 2/1934 | Brown | 280/5 D |
| 2,114,822 | 4/1938 | Thwaits | 280/5 D |
| 2,226,713 | 12/1940 | Folmsbee | 280/5 R |
| 2,792,231 | 5/1957 | Compton | 280/5 C |

Primary Examiner—Joseph F. Peters, Jr.
Assistant Examiner—Donn McGiehan
Attorney, Agent, or Firm—Biebel, French & Nauman

[57] ABSTRACT

A tank truck having a cylindrical tank resiliently supported on a bed frame of rectangular configuration and disposed above the main frame of the truck with the tank being disposed partially within the horizontal plane of the bed frame and having the bed frame resiliently supported on the main frame of the truck. A pair of saddle-shaped plates conforming to the outside of the cylindrical tank are secured thereto, one close to each end of the tank, and a pair of upper tank hold down brackets are secured to each saddle plate and in turn are resiliently bolted to corresponding lower tank hold down brackets which are rigidly secured to the bed frame. The brackets secured to the bed frame are in turn bolted to corresponding brackets on the main truck frame with resilient members placed between the bed frame and the truck frame to absorb shock. The resilient couplings not only absorb shock, but permit slight cushioning movement between the tank, bed frame and main frame during normal operating conditions on the roadway.

12 Claims, 6 Drawing Figures

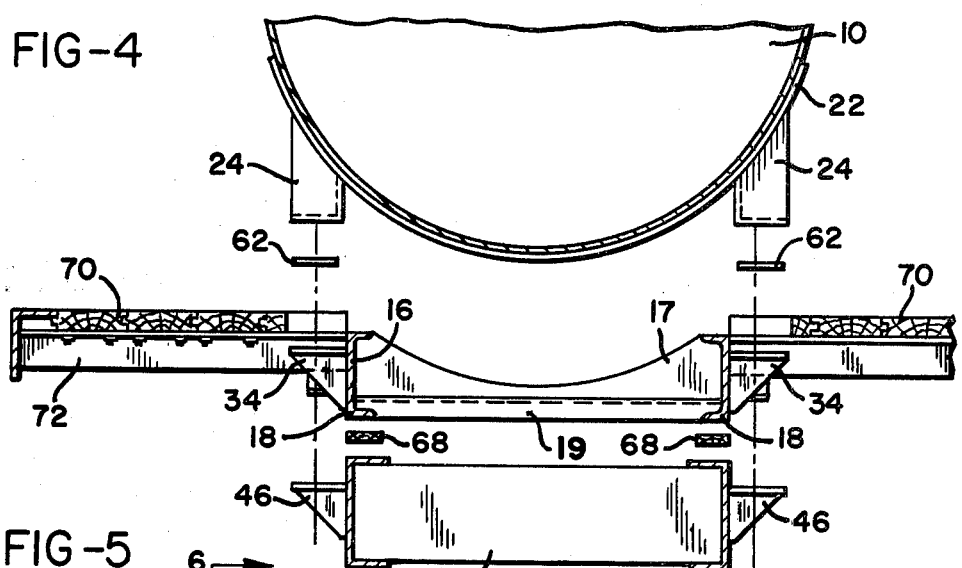
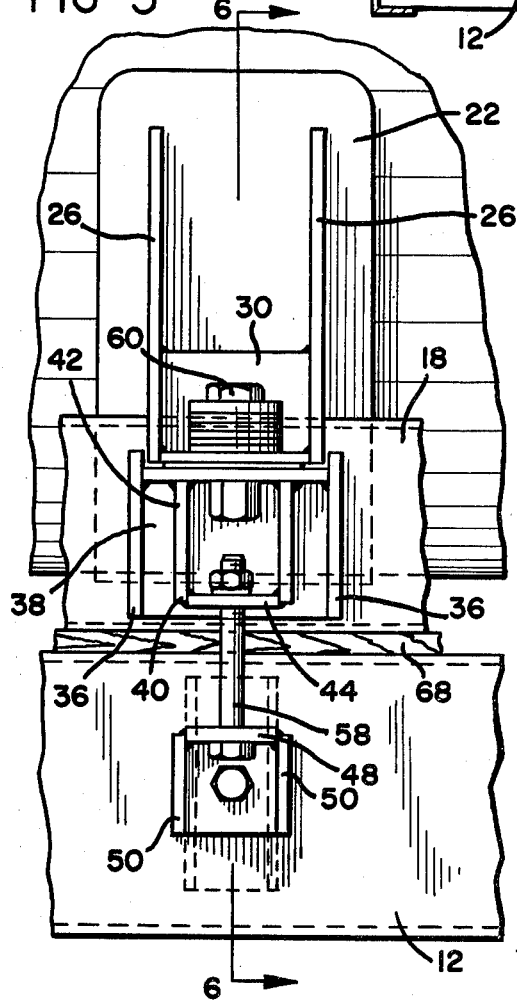
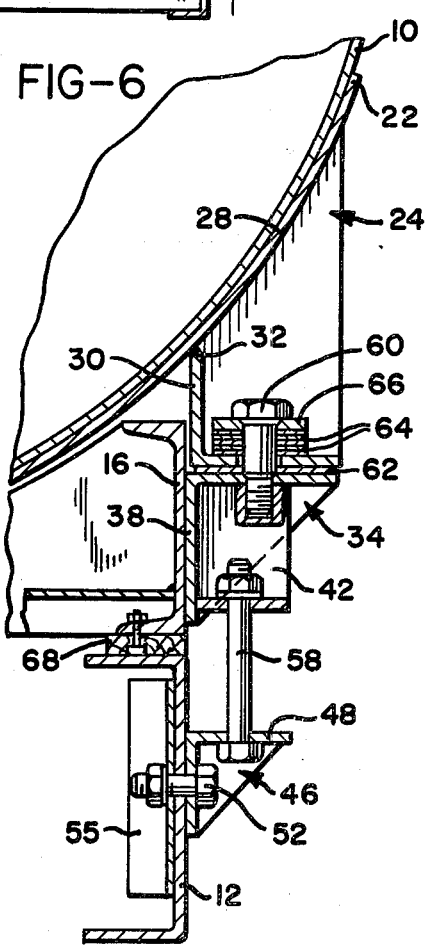

TANK SUPPORT FOR A TANK TRUCK

BACKGROUND OF THE INVENTION

1. Field of the Invention

The present invention relates to tank trucks, and more particularly, to means for resiliently supporting the tank on the truck frame.

2. Prior Art

There are a variety of tank trucks in commercial operation today most of which employ a substantially cylindrical tank which is secured in a variety of ways to a truck frame which in turn is supported by a suspension system on the axles of the truck, along with the cab. Many of these tank trucks have the tanks rigidly secured to the truck frame so that the only suspension or "give" during normal operation of the truck is provided by the suspension system of the truck.

During normal operation of such tank trucks the connections between the tank and the frame are subject to a variety of stress conditions due to turning, stopping, accelerating, etc. These loads cause cyclical stresses in the connections between the tank and the frame which eventually can result in fatigue failure if the support mountings are not designed to be adequately strong. As a result, the connections between the tank and the truck frame are usually overly massive in order to provide adequate safety margin to prevent such possible failures. Since the connection between the tank and the frame is generally a rigid connection the stresses produced in the mounting brackets are more severe than they would be if a more resilient mounting connection was provided and thus the mounting brackets must be additionally "beefed up" because of these higher stresses.

In addition to these deficiencies in such prior art tank trucks, additional stresses are produced due to the fact that the tank truck is mounted somewhere above the main frame of the truck and suspended on support legs which are rigidly secured to both the tank and the frame. This provides an increased moment about the connection points which further increases stresses under normal operation of the truck. This in turn, therefore, requires additional increasing of the massiveness of the support between the tank and the truck in order to provide adequate safety margins for the level of stresses involve.

SUMMARY OF THE INVENTION

The present invention overcomes the prior art difficulties and disadvantages by providing a resilient mounting system between the tank and a separate bed frame, and further, between the bed frame and the main frame of the truck, so as to reduce substantially the level of stresses in the support brackets and frame members and thus reduce the relative size of the support brackets over those of a more conventional nature. In addition, the present invention reduces the stress levels on the support brackets by reducing the moment arm of forces produced during a shifting of a load within the tank, by placing the tank slightly within the horizontal plane of the bed frame which in turn further reduces the relative size required for the support brackets over prior art tank trucks.

In the present invention the tank is provided with a pair of saddle plates conforming to the outside surface of the tank and extending across the lower portion thereof at spaced distances from the ends of the tank and rigidly secured thereto. Rigidly mounted on each side of the tank to end portions of each saddle plate are upper tank hold down brackets. Mounted to the bed frame in registry with the upper tank hold down brackets are lower tank hold down brackets, with the upper and lower brackets interconnected by a bolt having resilient spacers between the bolt and the brackets as well as between the adjacent brackets, so that a measure of resiliency is provided in the connection between the upper and lower tank hold down brackets.

In addition, a bed frame hold down bracket is securely mounted to the main frame of the truck in registry with each of the tank hold down brackets. The bed frame hold down brackets are bolted to the lower tank hold down brackets, which are secured to the bed frame and a resilient member lies between the main frame and the bed frame to provide a measure of resiliency between these connections.

BRIEF DESCRIPTION OF THE DRAWINGS

FIG. 4 is an exploded cross sectional view along line 4—4 of FIG. 3;

FIG. 5 is an enlarged elevational view of a hold down assembly of the preferred embodiment of the present invention; and FIG. 6 is an enlarged cross sectional view along line 6—6 of FIG. 5.

DETAILED DESCRIPTION OF THE PREFERRED EMBODIMENT

Figure 1:
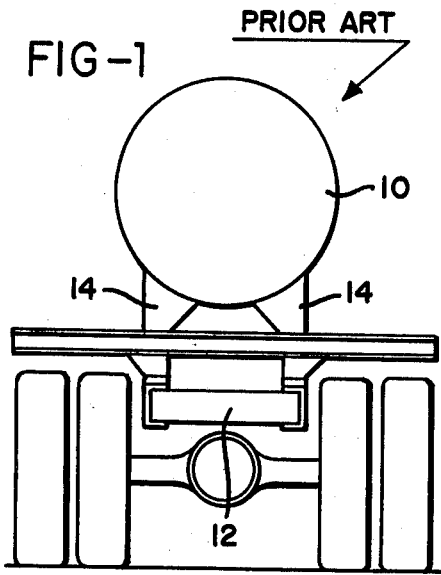
FIG. 1 is a schematic rear elevational view of a prior art tank truck illustrating a tank rigidly supported on legs from the truck frame.

As mentioned above, it is common in prior art tank trucks of the type illustrated in FIG. 1 to which the present invention generally relates, to secure the cylindrical tank 10 to the main truck frame 12 by using a plurality of rigid legs 14 which are rigidly secured as by welding on both sides of the tank, and positioned close to the front and rear portions of the tank as well as sometimes intermediate thereof, depending upon how much support is believed to be needed in order to safely carry the tank. The bottom of the legs 14 are then in turn either bolted or again welded to the frame in order to obtain a rigid connection from the tank 10 to the main frame 12 of the truck. Thus, the only resiliency in the support for the tank 10 is provided by the suspension system of the truck.

In addition, it can be seen from FIG. 1 that due to the fact that legs 14 are utilized to support the tank, the tank is positioned somewhat above the main truck frame 12. The distance from the center of the tank to the connection between the legs 14 and the frame 12 can be taken as the length of the moment arm through which the load contained within the tank would act as it is shifted, for example, when the truck goes around a corner. This distance therefore increases the effect of the force on the supports, over what it would be if the tank were disposed within or closer to the frame.

Figure 2:
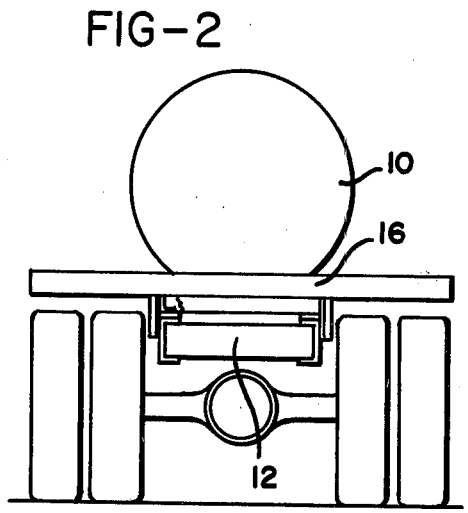
FIG. 2 is a schematic rear elevational view of the tank truck in accordance with the present invention with the lower portion of the tank disposed within the horizontal plane of the bed frame.

As can be seen from the rear elevational view of FIG. 2 of the preferred embodiment of the present invention, this latter moment arm is substantially decreased over such prior art trucks since the tank 10 in the preferred embodiment is disposed with its lower portion within the horizontal plane of the additional bed frame 16 which in turn is supported by the truck frame 12. In essence, with the support system of the present invention the legs 14 are eliminated and a series of brackets, discussed below, are utilized in place thereof.

The bed frame 16 is of generally rectangular cross section, and as best seen in FIG. 4, is provided with a plurality of cross support plates 17 secured between the sides formed by channel members 18. Plates 17 each have an annular upper edge which extends in spaced parallel relationship to the outer surface of the tank 10, in order to provide clearance therebetween, and the plates are welded at their ends to the sides of channel members 18. A further channel brace 19, associated with each cross support plate is welded to the lower portion of each side channel member 18 of the bed frame 16 to provide further support. A plurality of the cross support plates 17 and channel braces 19 are disposed at equally spaced locations along the length of the bed frame 16, and preferably with one aligned with each of the hold down assemblies 20 to provide additional stiffness to the frame at these attachment points.

Figure 3:
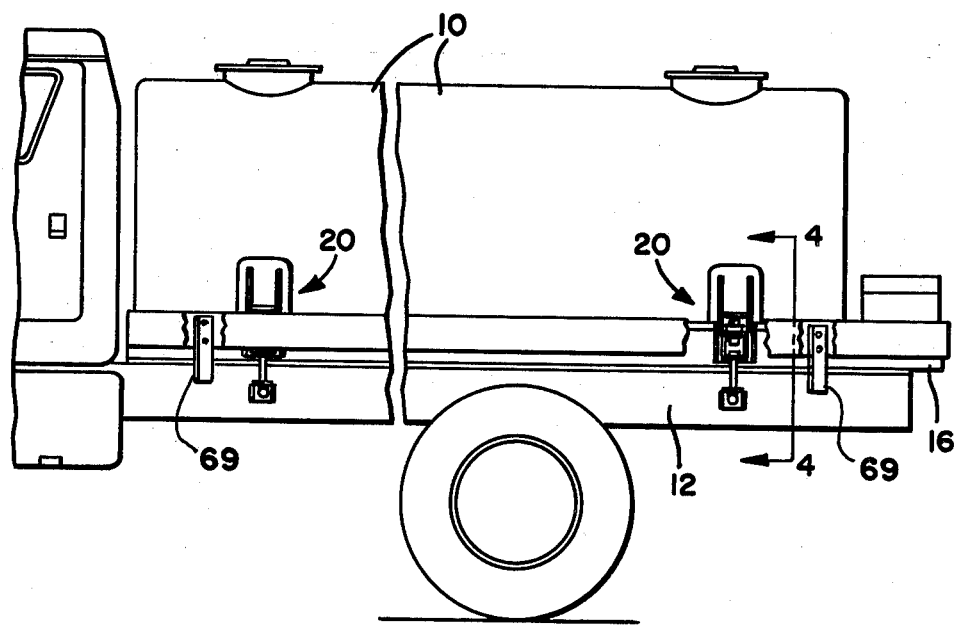
FIG. 3 is a side elevational view of a tank truck in accordance with the preferred embodiment of the present invention, with a portion of an outer rail broken away to illustrate the hold down means of the present invention.

In the present invention a plurality of the hold down assemblies 20, as illustrated in FIG. 3, are utilized to support the tank 10 on the main truck frame 12. Preferably, four bracket assemblies 20 are utilized on the tank truck with one pair being disposed slightly rearward of the front edge of the tank 10 and another pair disposed slightly forward from the rear edge of the tank.

Referring now to the details of an individual tank hold down assembly 20, and particularly with reference to FIGS. 5 and 6, a saddle plate 22 is rigidly secured and conforms to, the outside surface of the generally cylindrical tank 10 and is preferably secured by welding or the like so as to essentially become an integral part of the tank and thus not be permitted to have any movement relative to the tank when under loaded conditions. There are, in the preferred embodiment, two saddle plates 22, one each associated with the front and rear pairs of tank hold down assemblies 20.

Each tank hold down assembly then has an upper tank hold down bracket 24 welded or otherwise rigidly secured to the edge portion of the saddle plate 22 in alignment with the outer edges of the bed frame 16 and main truck frame 12. In the preferred embodiment the brackets 24 have two parallel vertically extending side walls 26 which have their edge portions 28 formed to the configuration of the saddle plate 22 so that they are in contact along that edge portion 28 with the saddle plate and are welded on both sides along their length to the saddle plates. An angle iron 30 is welded between the vertically extending members 26 as illustrated, and is also welded along its rear upper portion 32 to the saddle plate 22.

A lower tank hold down bracket 34 is welded to the bed frame 16 in registry with the upper tank hold down bracket 24. The lower tank hold down bracket 34 has a pair of parallel spaced vertically extending side plates 36 which are welded along their length to the side of the bed frame 16. An angle iron 38 is welded at each end to vertical side plates 36 and at its lower end is welded to the bed frame 16.

Bracket 34 also has a generally U-shaped portion 40 centered between side plates 36, which is formed by a pair of vertically extending spaced parallel plates 42 welded at their upper end portions and at their rear sides to the angle iron 38 and interconnected at their lower edge portion by a further plate 44 which is likewise welded along its length to the vertical members 40 and at its rear portion to the angle iron 38.

A bed frame hold down bracket 46 is securely mounted to the main truck frame 12 in registry with the upper and lower tank hold down brackets 24 and 34. Bracket 46 is formed from an angle iron 48 welded along both sides to vertically extending horizontally spaced side plates 50. Bracket 46 is secured to the main frame 12 by a bolt 52 extending through corresponding holes in bracket 46, frame 12 and a further channel shaped member 55 mounted on the inside of the frame 12. The channel shaped member 55 provides additional rigidity to the frame 12 in the area of the connection of brackets 46 through bolt 52, to reduce stresses due to bending in that area which would otherwise occur if the channel 55 is not utilized. Channel 55 should extend over a major portion of the height of frame member 12 in order to be effective in reducing flexure of the frame.

A plurality of holes are defined in the upper and lower hold down brackets 24 and 34 and the bed hold down bracket 46, in registry so as to permit bolt 58 to be connected between the lower tank hold down bracket 34 and bed frame bracket 46 and permit bolt 60 to be connected between upper tank hold down bracket 24 and lower tank hold down bracket 34. Positioned between the upper tank hold down bracket 24 and the lower tank hold down bracket 34 is a resilient member 62 which is preferably made of Buna N (a synthetic rubber made by the polymerization of acrylonitrile with butadiene) which is of sufficient strength to support the tank 10 when filled and yet provides some measure of resiliency between the upper and lower tank hold down brackets 24 and 34. Each of the resilient members 62 is of generally rectangular shape of slightly lesser extent than the profile of the bottom of the upper tank hold down bracket 24.

In addition, a plurality of further resilient spacers 64 of generally donut shape and of the same material as spacer 62, are positioned between the bolt 60 and the upper hold down bracket 24 along with a steel washer 66 which can be squeezed to a predetermined compression applied by bolt 60 which bottoms on the lower tank hold down bracket 34, in order to provide further measure of resiliency between the upper and lower tank hold down brackets 24 and 34.

Although bolt 58 is not provided with a similar arrangement to permit resiliency as is the bolt 60 and the associated spacers 64, a measure of resiliency between the bed frame 16 and main truck frame 12 is provided by an oak or similar hard wood runner 68 which extends along the length of the bed frame 16 on both sides of the bed frame between the bed frame and the main frame 12. The oak runner 68, or material of similar resiliency and strength characteristics, is bolted to the bottom of bed frame 16, as shown in FIG. 6, with three bolts on each side with the heads counter-sunk in the wood so they do not contact the truck frame 12. Thus it can be seen that there is resiliency in the mounting between the upper and lower tank hold down brackets and between the bed frame 16 and main frame 12. In order to prevent possible sideways shifting of the bed frame 16 on the main frame 12, a pair of angle iron brackets 69 are bolted to each side of the bed frame fore and aft of the tank hold down assemblies 20 as shown in FIG. 3. The brackets 69 extend downward along side the main frame 12, as shown in FIG. 2, but are not bolted to it. Thus they permit the resilient up and down movement described above, but block end sideways movement.

In addition, the specific structure of the brackets described above results in efficient transfer of the loads due to a shifting in the load during operation of the truck, from the tank to the bed frame without undue stress in the components.

An additional advantage of the arrangement of brackets constituting assemblies 20 is that the tank maybe removed from the bed frame and the bed frame likewise removed from the main frame 12 of the truck for ease of maintainance and substitution of damaged parts.

It is to be understood that the term "resiliency" as used herein is only intended to be that which is permitted by materials having similar characteristics in strength and resiliency of that of Buna-N. This resiliency is sufficient to permit a slight amount of "give" between the upper and lower tank hold down brackets 24 and 34 under normal operation of the truck to assist in reducing stresses on the brackets of the assemblies 20. In addition, the resiliency provided by the oak runner is of a similar firmness and should not be taken as an indication of allowing any major amounts of displacement between the bed frame 16 and the main truck frame 12. Rather, they are intended to permit a slight amount of give in order to reduce stresses otherwise imposed by a strictly rigid connection, while maintaining the various components in proper alignment which would not be the case if the members were permitted to be overly resilient.

It is further believed to be important that the outermost extent of the saddle plates should be slightly beyond the upper end portions of the side plates of upper tank hold down brackets 24 in order to reduce stress concentrations that might otherwise occur if the outer most edge portion of the saddle plates were coextensive with the upper portions of the upper tank hold down brackets 24. In addition, it is believed that the saddle brackets should extend approximately 120° around the circumference of the tank for effective stability.

Referring to the exploded view of FIG. 4, although they form no part of the present invention, a pair of wooden or steel deck-plate walk ways 70 are provided, one on each side of the tank 10 and are secured to the bed frame 16 by a plurality of angle irons 72 at spaced distances along their length, to permit the operators to stand on the walk ways 70 to reach the upper portion of the tank for filling through openings commonly provided, as illustrated in FIG. 3. The walk ways 70 are positioned so that the upper tank hold down brackets 24 extend through corresponding openings in the walk ways in order to permit them to be fastened to the lower tank hold down brackets 34 without operatively engaging the walk ways 70.

Although the foregoing illustrates the preferred embodiment of the invention, other variations are possible. All such variations as would be obvious to one skilled in this art are intended to be included within the scope of the invention as defined by the following claims.

What is claimed is:

1. In a tank truck including a main frame, supporting wheels, a cab and a tank mounted behind said cab, the improvement comprising:
   a bed frame disposed above said main frame;
   means interconnecting said bed frame to said main frame; and
   means mounting said tank resiliently within the horizontal plane of said bed frame and including a plurality of upper tank holddown brackets secured to said tank, a plurality of lower tank holddown brackets secured to said bed frame, and means resiliently interconnecting said upper tank holddown brackets to said lower tank holddown brackets.

2. The tank truck of claim 1 wherein said means interconnecting said upper and lower tank hold down brackets comprises:
   bolt means extending between said upper and lower tank hold down brackets; and
   resilient means disposed between opposing portions of said upper and lower tank hold down brackets.

3. The tank truck of claim 2 wherein said means resiliently interconnecting said upper and lower tank hold down brackets comprises resilient means interposed between a portion of said bolt means and an opposing portion of one of said hold down brackets.

4. The tank truck of claim 1 wherein said means interconnecting said bed frame to said main frame comprises:
   a lower tank hold down bracket secured to said bed frame;
   a bed frame hold down bracket secured to said main frame; and
   means interconnecting said lower tank hold down bracket and said bed frame hold down bracket.

5. The tank truck of claim 4 further comprising:
   resilient means interposed between opposing portions of said bed frame and said main frame.

6. In a tank truck including a main frame, supporting wheels, a cab and a tank mounted behind said cab, the improvement comprising:
   a bed frame disposed above said main frame;
   a plurality of bed hold down brackets secured at spaced locations along each side of said main frame;
   a plurality of lower tank hold down brackets secured to said bed frame, each in registry with a corresponding said bed hold down bracket;
   a plurality of upper tank hold down brackets secured to said tank, each in registry with a corresponding said lower tank hold down bracket;
   bolt means interconnecting each said bed hold down bracket with said corresponding lower tank hold down bracket; and
   further bolt means interconnecting each said lower tank hold down bracket with said corresponding upper tank hold down bracket.

7. A tank truck as defined in claim 6 including resilient means associated with said bolt means, said further bolt means, said upper and lower tank hold down brackets and said bed and main frames for resiliently interconnecting said tank with said bed frame and said bed frame with said main frame.

8. A tank truck as defined in claim 6 including:
   resilient spacer means disposed between said upper and lower tank hold down brackets and between said further bolt means and said upper tank hold down brackets for resiliently supporting said tank on said bed frame; and
   further resilient spacer means disposed between said bed frame and said main frame for resiliently supporting said bed frame on said main frame.

9. A tank truck as defined in claim 8 wherein said resilient spacer means includes a plurality of resilient donut-shaped members surrounding an end portion of each said further bolt means and said upper tank hold down brackets and said further resilient spacer means includes a pair of resilient runners disposed between overlying side portions of said bed frame and said main frame.

10. A tank truck as defined in claim 9 wherein said resilient donut-shaped members are formed of Buna N or similarly resilient material and said runners are formed of oak wood or similar resilient material.

11. A tank as defined in claim 10 wherein said donut shaped members are compressed by said further bolt means to a predetermined value.

12. A tank as defined in claim 6 including at least two saddle plates conforming to the outer surface of said tank and disposed in horizontally spaced relation along the bottom portion of said tank and rigidly secured thereto; and each said upper tank hold down bracket being rigidly secured to a respective one of said plates in spaced pairs on opposite sides of said tank and in registry with said lower tank hold down brackets.

* * * * *